United States Patent [19]
Leonard

[11] 3,903,783
[45] Sept. 9, 1975

[54] INVERSION STRUCTURE INDICATOR

[76] Inventor: Verna M. Leonard, 8701 Highway 41, Fresno, Calif. 93710

[22] Filed: July 24, 1974

[21] Appl. No.: 491,255

[52] U.S. Cl. ............................. 84/471; 84/477 R
[51] Int. Cl.² ........................................ G09B 15/02
[58] Field of Search ............................ 84/470–474, 84/477 R, 478–482

[56] References Cited
FOREIGN PATENTS OR APPLICATIONS
710,999   6/1965   Canada ............................. 84/473

*Primary Examiner*—Joseph W. Hartary
*Assistant Examiner*—John F. Gonzales
*Attorney, Agent, or Firm*—Ralph S. Branscomb

[57] ABSTRACT

The invention is a chord inversion teaching aid designed to teach the root position and all of the inversions of any particular chord in a graphic manner which de-emphasizes the dominant role generally assigned to the root position. The device comprises a planar base having a central row of indicia displaying the scale tones of a chord in two octaves, and several pivotal panels above the row which point out the scale tones in the row which are used in the root position and the various inversions. A pad of musical staff paper is mounted below the row of scale tones so that the user may write in the notes of the inverted chords directly on a staff.

5 Claims, 2 Drawing Figures

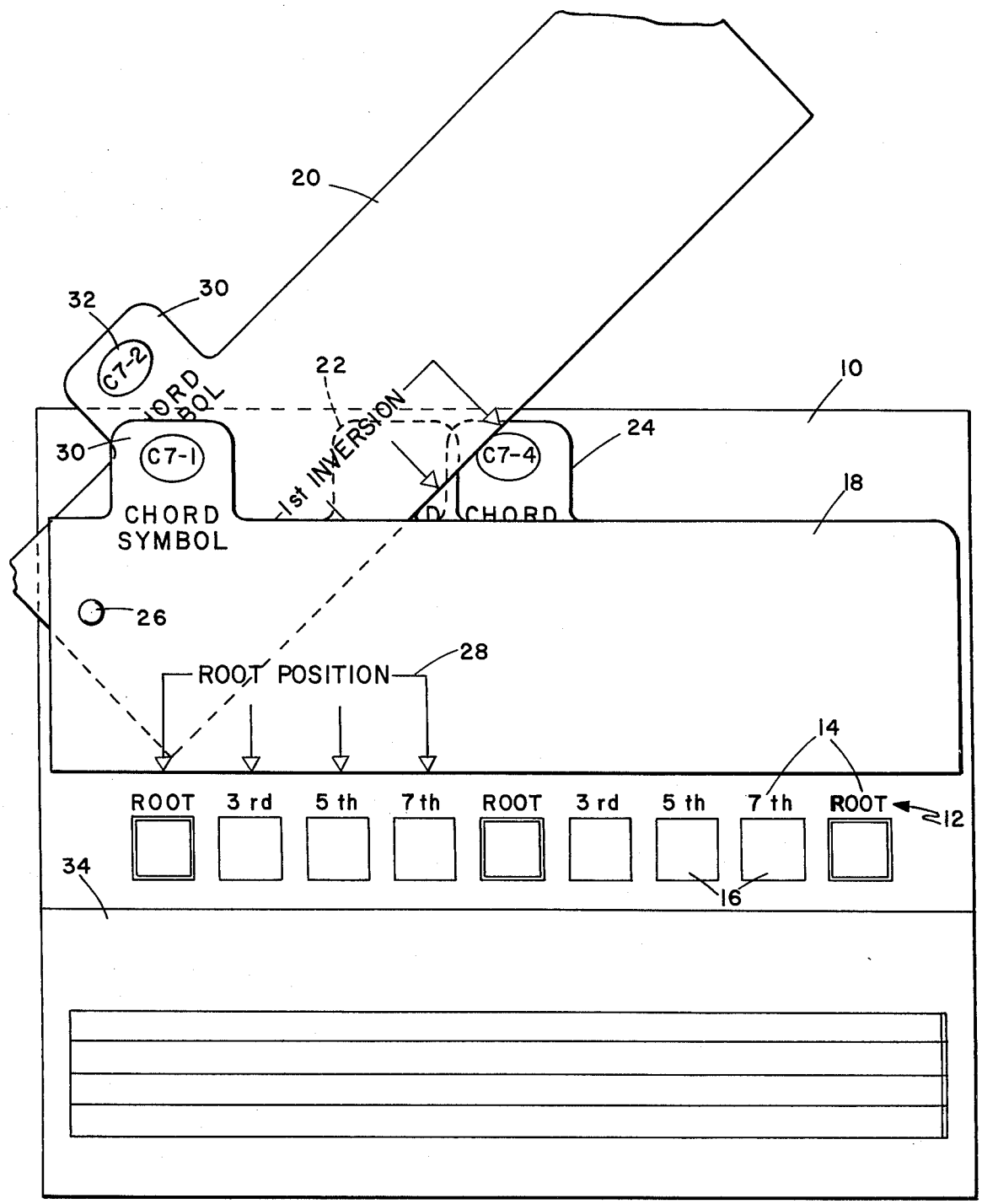
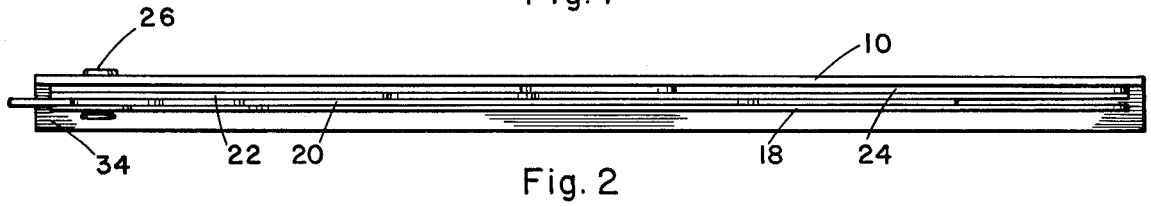
Fig. 1
Fig. 2

INVERSION STRUCTURE INDICATOR

BACKGROUND OF THE INVENTION

It is very common in music to utilize chord inversions rather than the root chord, and often the inversions predominate because they are considered to have a more pleasant and interesting sound than the root. However, as the student progresses through his music studies the root position of the chords is taught almost exclusively until a certain level of sophistication is reached, leading the student to believe that the inversions are not only different, but deviant and superfluous forms of the chord which should be avoided, when actually they form the backbone of musical composition. When the inversions are finally taught it is generally done on the piano keyboard whereupon the uniform incremental advance of the higher inversions from the root is camouflaged by the variant hand positions required to play them.

SUMMARY OF THE INVENTION

The present invention aids in the teaching of the inversion structure and avoids the misconceptions and difficulties arising from the use of former methods. A planar backing or base is provided having centrally displayed thereon a laterally extended row of the scale tones used in a particular chord in two octaves, and above this row is a plurality of overlaid pivotal panels, each panel pointing out which of the scale tones are used in a particular inversion or the root position and identifying same. By flipping the uppermost panel out of the way, the next succeeding inversion is exposed on the subsequent panel and so forth so that the student can clearly visualize the simple progressive nature of the inversions. The panels also display an alternative inversion naming system wherein the group of chords consisting of the root and its inversions are numbered consecutively beginning with the root. This alternative system tends to de-emphasize the root and lend equal dignity to the inversions.

Below the row of scale tones is a musical staff pad for the inscription of the various chord forms.

BRIEF DESCRIPTION OF THE DRAWINGS

FIG. 1 is a front elevation view of the invention with the second panel pivoted upwardly;

FIG. 2 is a top view looking down on the invention as shown in FIG. 1.

DETAILED DESCRIPTION OF THE PREFERRED EMBODIMENT

Each of the units is designed toward a single base chord which is C7 in the illustrations. The device has a planar backing or base member 10 having displayed across its midsection a lateral row 12 of uniformly spaced indicia 14 identifying the scale tones by their scale degrees, the "ROOT", "3rd", "5th", etc. representing the scale degrees of the diatonic scale of the key of C used for the C7 chord. The row of scale tones spans two octaves and preferably names the root at the end so that nine scale tones are represented in the row illustrated since C7 is a four-tone chord. A plurality of boxes 16 disposed below the indicia 12 may be used to write in the scale tone names identified by the scale degrees.

Several overlaid panels 18, 20, 22, and 24 are pivoted to the base at 26 such that the forward panels can be pivoted into the position illustrated for the second panel 20 to expose subsequent panels. Indicia 28 on the lower portions of the panels indicate by arrows which of the identified scale tones 14 comprise the root chord and 1st, 2nd, and 3rd inversions.

Each of the panels is provided with a tab 30 to facilitate moving the individual panels, and each tab displays the chord symbol and a number as at 32. The numbering provides an alternative to the inversion nomenclature wherein the root position of the chord is simply the C7 - 1 chord, the first inversion is the C7 - 2 chord, and so forth. This numbering system suggests to the student that there are four separate chords in the C7 group, all of equal importance, as opposed to the conventional system wherein there is one C7 chord and three inversions.

Mounted on the base below the row of boxes 16 is a musical staff paper writing pad 34.

In use, the student first writes the appropriate scale tone names in the boxes 16 and then writes the notes corresponding to the C7 - 1 chord, or root position, on the pad 34. Any octave may be selected, and the appropriate clef sign inscribed on the staff. The panel 18 is then pivoted out of position and the panel 20 exposed and the C7-2 chord, comprising the 3rd, 5th, 7th and root tones, is written on the staff. All four panels are used in this manner, and the process is repeated on different sheets of the staff paper for different octaves.

Several of the units are preferably provided so that more than one chord is represented. After repetitive use of the teaching aid, the student is comfortable with the general inversion concept for all chords and has hopefully transcended the strait-jacketed thinking wherein the root position is supreme for all chords.

I claim:

1. A chord inversion structure teaching aid comprising:
   a. a planer base;
   b. said base having displayed thereon a plurality of uniformly spaced indicia extended in a lateral row and identifying the scale tones of a particular chord in two octaves;
   c. a plurality of selectively exposable panels pivotally mounted on said base and pivotal into registration with said row, each of said panels having thereon indicia indicating by juxtaposition when so pivoted which ones of said identified scale tones comprise the scale tones of a particular inversion of said particular chord and identifying said particular inversion.

2. Structure according to claim 1 and including a panel having thereon indicia indicating which ones of said identified scale tones comprise the scale tones of the root position of said particular chord, and said panels are mounted by a common pivot and are numbered consecutively in order of the inversion indicated thereon beginning with said panel indicating the scale tones of the root position.

3. Structure according to claim 2 wherein said identifying indicia comprise the scale degrees of the scale tones of the particular chord, and an area adjacent each of said scale degree indicia is provided in blank for the inscription of the scale tone names thereon.

4. Structure according to claim 1 wherein said panels are provided in a number equal to all the possible inversions of said particular chord and each panel represents a different inversion from every other panel.

5. Structure according to claim 1 wherein said panels are disposed above said row and including a pad of musical staff paper mounted on said base below said row.

* * * * *